Oct. 12, 1971    F. A. O'LOUGHLIN    3,611,563
METHOD FOR CONNECTING A CONDUCTOR TO A POST
Filed Dec. 3, 1969    2 Sheets-Sheet 1
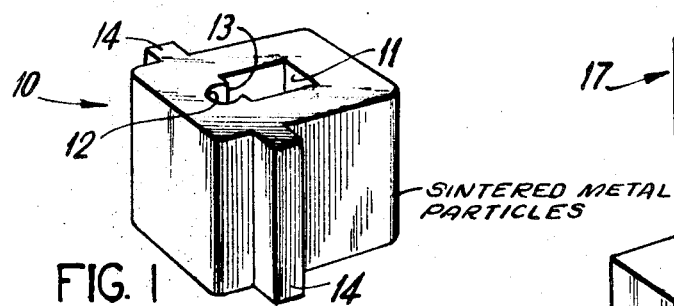
FIG. 1
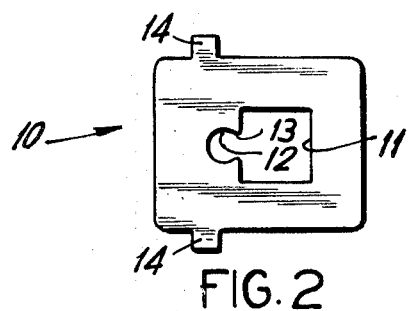
FIG. 2
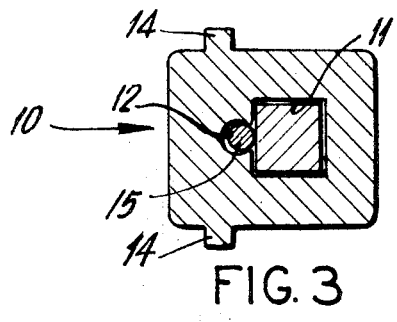
FIG. 3
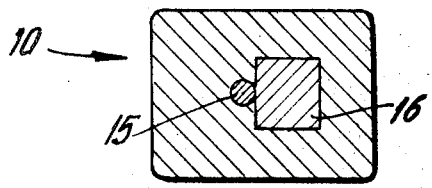
FIG. 4
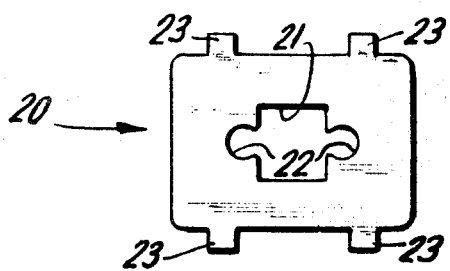
FIG. 5
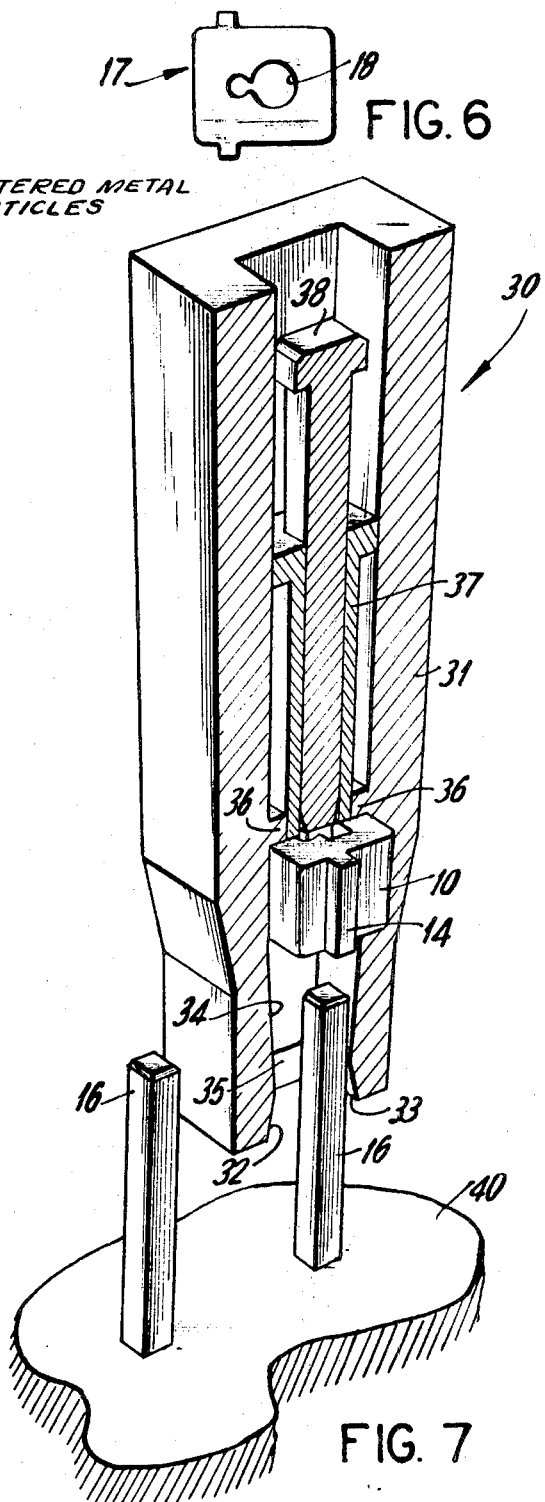
FIG. 6
FIG. 7
INVENTOR.
FRANCIS A. O'LOUGHLIN
BY
Thomas M Marshall
ATTORNEY Oct. 12, 1971    F. A. O'LOUGHLIN    3,611,563
METHOD FOR CONNECTING A CONDUCTOR TO A POST
Filed Dec. 3, 1969    2 Sheets-Sheet 2

INVENTOR.
FRANCIS A. O'LOUGHLIN
BY
Thomas M. Marshall
ATTORNEY

United States Patent Office 3,611,563
Patented Oct. 12, 1971

3,611,563
METHOD FOR CONNECTING A CONDUCTOR TO A POST
Francis A. O'Loughlin, Scotch Plains, N.J., assignor to Thomas & Betts Corporation, Elizabeth, N.J.
Filed Dec. 3, 1969, Ser. No. 881,783
Int. Cl. H02g 15/08
U.S. Cl. 29—628                    1 Claim

ABSTRACT OF THE DISCLOSURE

The connector is constructed of a substantially rectangular cross-sectional shape with a bore and a recess passing therethrough so as to initially receive the post and conductor respectively therein with slight clearances. Additionally, the connector is provided with a pair of protrusions on opposite sides so that upon crimping of the protrusions against the connector, the material of the connector flows in transverse perpendicular planes to close upon the conductor and post while obtaining a gas tight fit between the conductor, connector and post.

---

This invention relates to a connector for forming a connection between a conductor and a post. More particularly, this invention relates to a method of connecting the conductor to a post.

Heretofore, various types of connections have been made between electrical conductors and posts. In many instances, these connections have been made with the use of soldering techniques. However, soldering has not always provided an efficient gas tight joint and thus has not been reliable. In order to overcome the disadvantages of soldered joints, various other types of mechanical connections have been made between conductors and posts. For example, it has been known to mechanically and electrically connect a conductor to a post using a deformable connector such as powdered metal connectors. Generally, in forming such connections, the connectors have been subjected to substantially circumferentially applied compressive forces so as to deform the connectors onto the conductors and posts. Because of this, specialized tools have been adapted so as to properly apply the compressive forces without creating tensile stresses within the powdered metal connectors.

Accordingly, it is an object of this invention to form a reliable connection without the use of specialized tools. It is another object of this invention to provide a connection between a conductor and a post in a simple reliable manner.

It is another object of this invention for forming an electrical connection without the use of circumferentially applied crimping forces.

Briefly, the invention provides a connector for forming a mechanical and electrical connection between an exposed conductor and a post as well as a method for forming the connection.

The connector is constructed of a body of sintered powdered metal of deformable construction and of substantially rectangular shape. The body of the connector is provided with a bore of polygonal cross section, such as a rectangular or circular cross-section which passes longitudinally through the body and which is sized to receive a similar shaped post therein with a slight clearance. In addition, the body of the connector is provided with a recess which is parallel to the bore and which is in open communication with the bore so as to receive an exposed conductor therein with a slight clearance. The body of the connector is also provided with at least one pair of protrusions which extend longitudinally along the body and which extend outwardly thereof from opposite sides.

The method of making the connection includes the steps of initially placing an exposed conductor in the recess of the connector and of subsequently positioning the connector over a post with both the post and the conductor received with a slight clearance. Thereafter, the connector is subjected to a crimping operation in which the protrusions of the connector are crimped into the connector while the connector is deformed in two perpendicular planes so as to compress the connector into a gas tight connection with the conductor and post. During the crimping of the protrusions into the body of the connector, the connector body compresses in a plane parallel to the plane of the crimping forces while elongating in the plane perpendicular in the plane of the crimping forces. Upon completion of the crimping operation, the connector will have deformed into a rectangular shape with the material of the protrusions being displaced into the rectangular shape.

These and other objects and advantages of the invention will become more apparent when taken in conjunction with the following detailed description and the accompanying drawings in which:

FIG. 1 illustrates a perspective view of a connector according to the invention;

FIG. 2 illustrates a plane view of the connector of FIG. 1;

FIG. 3 illustrates a plane view of the connector about a conductor and a post prior to the crimping operation;

FIG. 4 illustrates a plane view similar to FIG. 3 of the connector compressed about a conductor and a post after the crimping operation;

FIG. 5 illustrates a modified connector of the invention;

FIG. 6 illustrates a second modified connector of the invention;

FIG. 7 illustrates an apparatus for forming the crimping operation;

Figure 8:
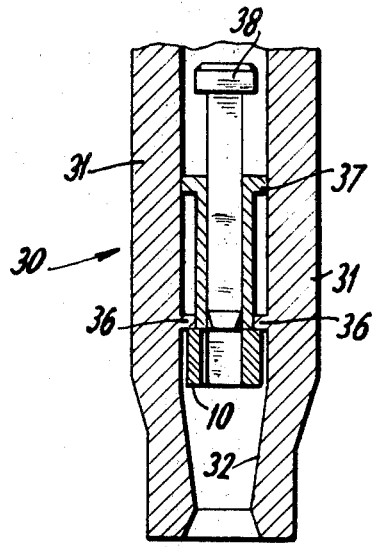
FIG. 8 illustrates a cross-sectional view of the crimping apparatus prior to placement of the conductor into the connector.

Referring to FIG. 1, the connector 10 is formed in a substantially cubic shape with a rectangular cross section. The connector 10 has a body which is provided with a bore 11, for example, of rectangular section which passes longitudinally through the body and with a recess 12 of substantilly circular cross section which lies in communication with the bore through an open slot 13. Additionally, the connector body is provided with a pair of protrusions 14 which extend from opposite sides of the body substantially along the length of the body. These protrusions 14 are positioned to one side of a plane passing diametrically through the recess 12 and opposite from the bore 11.

The connector 10 is made of sintered powdered metal particles, such as copper, aluminum, alloys, or any other suitable metal or alloy material. In addition, the connector 10 is formed so as to be deformable under a crimping operation wherein deforming forces are applied against the protrusions 14 and directed inwardly of the connector towards the opposite protrusion 14. That is, the connector 10 is constructed so as to be deformable under oppositely applied compressive forces so as to compressively deform in the plane of the crimping forces while elongating in a plane perpendicular to the crimping forces in directions inwardly and outwardly of the recess 12 and bore 11.

Referring to FIG. 3, in order to form a connection between a conductor 15 having an exposed electrical surface and a post 16 of square or rectangular shape, the connector 10 is sized such that the bore 11 and recess 12 receive a respective post 16 and conductor 15 therein with a slight clearance. Of course, it is readily appreciated that the cross-sectional configuration of the bore conforms to the cross-sectional configuration of the post 16, whereby in those instances where round posts are provided, the bore is similarly configured.

Referring to FIG. 4, after a crimping operation has been performed to deform the protrusions 14 into the body of the connector 10 so as to impart a rectangular cross section or shape to the connector 10, the material of the connector 10 will completely fill the spaces about the conductor 15 and post 16 so that a gas tight connection is formed. As shown, the conductor 15 and post 16 are received in contiguous contact with each other and are completely surrounded by the material of the connector 10.

Referring to FIG. 5, the connector 20 can be modified so as to form a connection between a single post and a pair of conductors. To this end, the conductor 20 is symmetrically formed with a rectangular shaped bore 21 for receiving a post with a slight clearance and a pair of recesses 22 to opposite sides of the bore 21. As above, the recess for each of the conductors to be received is of slightly greater dimension than the cross-sectional shape of the conductor, and the configuration of the bore 21 may be any shape as determined by the cross-sectional configuration of the associated post. In addition, two pairs of protrusions 23 are provided with one pair of protrusions 23 on each side of the bore 21 spaced from the bore 21 on one side of a plane passing diametrically through a respective recess 22 and opposite surfaces of the connector 20. During a crimping operation, crimping forces are applied to the pairs of protrusions 23 substantially simultaneously so that the material of the protrusions 23 flow or deform into the body of the connector 20 so as to impart the final rectangular cross-sectional shape to the completed connection.

FIG. 6 illustrates a connector 17 of modified design including a circular bore 18 for use in connection with correspondingly configured round posts.

Referring to FIG. 7, an apparatus 30 for performing a crimping operation for deforming a connector 10 onto a post 16 and a conductor 15 includes a sleeve 31 having a bore 32 of substantially rectangular cross section passing therethrough with variable dimensions. The sleeve 31 is provided with a mouth 33 which is sized to envelop a post 16 of a series of posts 16 of a suitable electrical unit. In addition, the mouth 33 of the sleeve 31 is tapered inwardly on two opposite sides so as to constrict the size of the bore 32 to a size sufficient to cause deformation of the protrusions 14 on the connector 10 positioned therein as well as deformation of the connector 10 onto the post 16. The sleeve 31 is further provided with a tapered portion 34 which tapers from the crimping point 35 outwardly towards the opposite end of the sleeve 31 so as to initially receive a connector 10 therein. Also, a pair of flanges 36 are disposed within the sleeve of a size to prevent further passage of a connector 10 into the interior of the sleeve 31.

The crimping apparatus 30 is further provided with a hollow mandrel 37 concentrically positioned within the bore 32 of the sleeve 31 so as to slide within the flanges 36, and abut against the base of the connector 10. The mandrel 37 is connected to a suitable mechanism (not shown) within the sleeve 31 so as to be maintained in various positions relative to movement of the sleeve 31.

Further, a pilot 38 is positioned concentrically within the mandrel 37 in a reciprocally mounted manner. The pilot 38 can be spring mounted or air actuated so as to move relative to the hollow mandrel 37. The pilot 38 is sized to conform with the size of the bore 11 in the connector 10 such that when the connector 10 is initially inserted into the sleeve 31 of the apparatus 30 such is positioned to abut the pilot 38.

Figure 9:
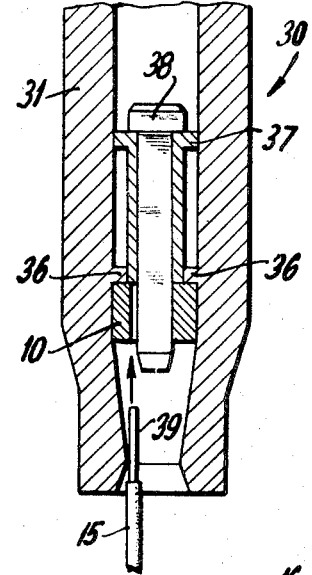
FIG. 9 illustrates a cross-sectional view similar to FIG. 8.
Figure 10:
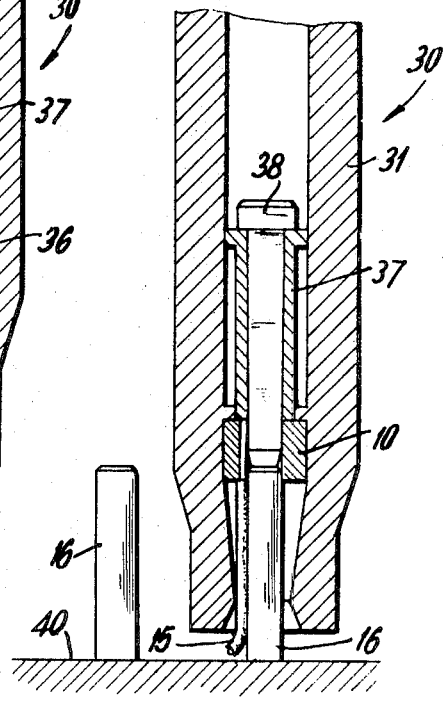
FIG. 10 illustrates a cross-sectional view prior to positioning of the connector over the post.
Figure 11:
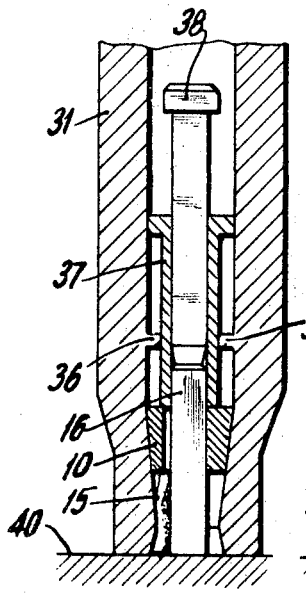
FIG. 11 illustrates a position of the apparatus of FIG. 7 prior to initiation of the crimping operation.
Figure 12:
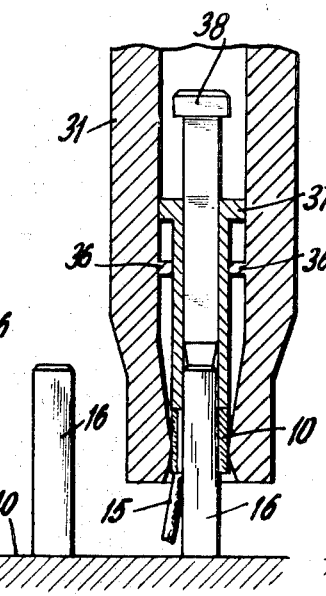
FIG. 12 illustrates a view of the apparatus during the crimping operation.
Figure 13:
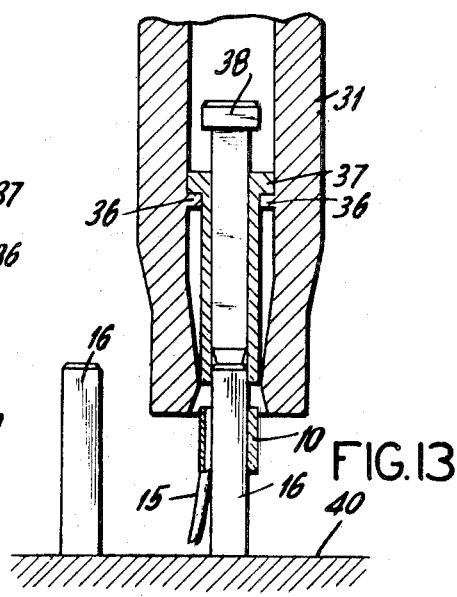
FIG. 13 illustrates a view of the crimping apparatus after crimping of the connector onto the conductor and post.

Referring to FIG. 8, initially a connector 10 is positioned within the bore 32 of the sleeve 31 in abutment against the flanges 36 and the mandrel 37 therein. Thereafter, referring to FIG. 9, the pilot is slid through the bore 11 of the connector 10 so as to position the connector 10 therein in a substantially secure manner. Next, the stripped end 39 of the conductor 15 is inserted into the mouth 33 of the sleeve 31 and placed within the recess 12 of the connector 10. Next referring to FIG. 10, the sleeve 31 is moved downwardly so as to envelop a post 16 therein. In this position, both the conductor 15 and post 16 pass through the mouth 33 of the sleeve 31 such that the post 16 abuts against the pilot 38 within the sleeve 31. Referring to FIG. 11, the sleeve 31 is then moved further downward so as to abut against the electrical unit 40 on which the post 16 is mounted while the pilot 38, due to the device of loading thereof, is caused to remain in place during this movement. At the same time, the mandrel 37 is moved along with the sleeve 31 so as to force the connector 10 from the pilot 38 onto the post 16 with the conductor 15 also moving downwardly with the connector 10. Referring to FIG. 12, the sleeve 31 is thereafter moved upwardly while the mandrel 37 remains in a fixed position relative to the connector 10 and post 16. This causes the tapered surface of the sleeve 31 to move against the protrusions 14 until the crimping points 35 are reached such that the protrusions 14 are deformed into the body of the connector 10. At the same time, the connector 10 is deformed inwardly of itself in the direction of the crimping forces imposed by the sleeve 31. Also, the connector 10 is allowed to elongate in a direction perpendicular to the plane of the crimping forces. A gas tight connection is thus formed. Referring to FIG. 13, continued upward movement of the sleeve 31 causes the hollow mandrel 37 to engage against the flanges 36 causing upward movement of the mandrel 37 and subsequently, in a similar manner, upward movement of the pilot 38.

It is noted that the apparatus described above can be used to form a number of connections between a plurality of connectors and conductors to a single post. In this respect, the connectors would be mounted along the post with respective conductors inserted therein. The upward movement of the sleeve of the apparatus relative to the various connectors would deform each connector in its turn so as to form a gas tight connection between each of the connectors and conductors with the post.

It is noted that the bore of the sleeve is sized so as to permit the connector to expand in the direction perpendicular to the plane of the crimping forces. For example, it has been found for a connector which is initially sized with a length of .07 inch in the direction perpendicular to the plane of the protrusions and width of .08 inch from the outer edge to the outer edge of the protrusions, that the final shape after crimping or swaging by the apparatus described above results in a rectangular shape of .08 inch in length and .06 inch in width. Thus, the sleeve is adapted to accommodate the increase in dimension of the connector from .07 inch to .08 inch.

The invention thus provides a connector for forming a connection between a conductor and a post in a manner which avoids circumferential application of the compression or swaging forces and thus does not require specialized tools.

The invention further provides a connector which can be used to form a plurality of gas tight connections between conductors and posts in a rapid manner. Thus, a greater number of connections can be made on an electrical installation unit than heretofore achieved with prior tehniques.

What is claimed is:

1. A method of forming an electrical connection between a post and a conductor comprising the steps of:
providing a connector of sintered powdered metal having a bore of slightly greater dimensions than the post, a recess of slightly greater dimensions than the conductor, said bore and recess being in open communication, and a pair of protrusions on the opposite sides of the periphery of the connector in the region of communication between said bore and recess;
placing the conductor in the recess of the connector;
subsequently positioning the connector over the post with the post received with a slight clearance in the bore of the connector and with the conductor remaining in the recess;
thereafter subjecting the connector to a crimping operation in which the opposed protrusions of the connector are crimped into the connector to fill the clearance between the post, conductor, and connector, while the connector is deformed in two perpendicular planes so as to compress the connector into a gas-tight connection with the conductor and post.

References Cited

UNITED STATES PATENTS

| | | | |
|---|---|---|---|
| 2,672,596 | 3/1954 | Grypma | 174—90 X |
| 3,345,452 | 10/1967 | Logan et al. | 174—94 X |
| 3,376,170 | 4/1968 | Logan et al. | 174—94 X |
| 3,461,221 | 8/1969 | Herb | 339—276 X |
| 3,488,432 | 1/1970 | Fernandes et al. | 174—94 X |

DARRELL L. CLAY, Primary Examiner